US005791655A

United States Patent [19]

Daniel et al.

[11] Patent Number: 5,791,655

[45] Date of Patent: Aug. 11, 1998

[54] METHOD FOR CONTROLLING OIL IN A PRESS

[75] Inventors: Edward A. Daniel; Norman J. Couchot, both of Fort Loramie; Daniel L. Keller; William C. Brewer, both of Minster, all of Ohio

[73] Assignee: The Minster Machine Company, Minster, Ohio

[21] Appl. No.: 926,292

[22] Filed: Sep. 5, 1997

Related U.S. Application Data

[60] Continuation of Ser. No. 539,963, Oct. 6, 1995, abandoned, which is a division of Ser. No. 409,910, Mar. 23, 1995, Pat. No. 5,467,705, which is a continuation of Ser. No. 108,067, Aug. 17, 1993, abandoned.

[51] Int. Cl.[6] .......... F16J 15/40

[52] U.S. Cl. .......... 277/300; 277/513; 277/514

[58] Field of Search .......... 277/1, 2, 3, 15, 277/17, 18, 29, 300, 512, 513, 514, 457

[56] References Cited

U.S. PATENT DOCUMENTS

| | | | |
|---|---|---|---|
| 2,488,200 | 11/1949 | Juhlin et al. | 277/18 |
| 4,083,566 | 4/1978 | Bentsson et al. | 277/3 |
| 4,425,838 | 1/1984 | Pippert | 92/86 |
| 4,428,584 | 1/1984 | Shapiro | 277/3 |
| 4,499,969 | 2/1985 | Toombs | 184/106 |
| 4,503,693 | 3/1985 | Lesiecki et al. | 277/17 |
| 4,726,689 | 2/1988 | Pollack | 277/3 |
| 4,854,152 | 8/1989 | Portmann | 72/456 |
| 4,896,890 | 1/1990 | Mauney | 277/3 |
| 4,945,724 | 8/1990 | O'Neal | 60/455 |
| 5,061,078 | 10/1991 | Yada | 366/76 |
| 5,072,949 | 12/1991 | Lopperi | 277/3 |

FOREIGN PATENT DOCUMENTS

| | | |
|---|---|---|
| 0334655 | 3/1989 | European Pat. Off. . |

*Primary Examiner*—Daniel G. DePumpo
*Attorney, Agent, or Firm*—Randall J. Knuth

[57] ABSTRACT

A dynamic oil control mechanism for a press including a vacuum inducing ejector or jet-pump to vacuum oil leaking from about an oil seal. The oil seal is located around the drive piston on the press slide to prevent oil migration from the press crown to the die area or slide of the press. A drain port is located about the housing in which the drive piston reciprocates. The ejector maintains a low pressure area within the drain port to pull oil leaking from the seal into the drain port and away from the drive piston. The vacuumed oil is then transferred to an oil reservoir.

9 Claims, 4 Drawing Sheets

METHOD FOR CONTROLLING OIL IN A PRESS

This is a continuation of application Ser. No. 08/539,963, filed Oct. 06, 1995 now abandoned, which is a division of application Ser. No. 08/409,910, filed Mar. 23, 1995 now U.S. Pat. No. 5,467,705, which is a continuation of application Ser. No. 08/108,067, filed Aug. 17, 1993 now abandoned.

BACKGROUND OF THE INVENTION

The present invention relates generally to mechanical presses or to any press with a sealed drive piston, and in particular, to an oil control system which prevents lubricating oil from leaking onto and contaminating the product stamped by the press die.

Mechanical presses, for example, straight side and gap frame stamping and drawing presses, comprise a frame having a crown and bed and a slide supported within the frame for motion toward and away from the bed. Between the slide and bed is located the press die within which a product is stamped or drawn. The slide is driven by a crankshaft having a connecting arm connected to the slide. Such mechanical presses are widely used for stamping and drawing operations and vary substantially in size and available tonnage depending upon the intended use.

In most cases, lubricating oil within the press drive, through gravity and open areas in the press crown, moves down onto the slide and ultimately migrates toward the press die. This oil can find its way to the product being worked upon in the press. If the workpiece becomes contaminated with oil, it may be rejected and scrapped, thereby increasing production costs. This is an important issue in industries dealing with food and beverage containers.

Certain prior art presses have been designed with pistons which protrude from the bottom of the crown. The slide is attached to these pistons which are in turn connected to the press drive for reciprocation. Seals installed about these pistons seal the oil within the crown and keep it from contaminating the workpieces. This oil control means is passive, and works only while the seal maintains its integrity. Seal damage due to installation, contamination, corrosion, or seal compression either occur rapidly or eventually, degrading the seals' ability to retain oil within the crown. Eventually, an oil leak occurs that allows oil to reach the stamped workpieces, thus ruining the product and increasing production costs.

The present invention is directed to overcome the aforementioned problem associated with mechanical press oil seals wherein it is desired to dynamically control oil from leaking oil seals by vacuuming the oil away from the seals prior to the oil reaching the workpiece.

SUMMARY OF THE INVENTION

The present invention provides a dynamic system to remove oil from leaking seals on piston driven presses, thereby allowing long economical production runs of non-contaminated product.

Generally, the invention provides a seal about the drive piston of the slide to prevent migration of lubrication oil from the press crown to the slide or to the product worked on by the press. An oil control mechanism operates to vacuum oil, that has leaked past the drive piston seal, away from the drive piston to an oil sump or reservoir.

In one form of the invention, a vacuum housing having an annular drain port is attached below the oil seal. This drain port is placed under vacuum to pull any oil leaking from the seal, and a certain amount of ambient air, away from the drive piston. A vacuum generator, comprising an air driven ejector, creates the oil displacing vacuum within the drain port. By varying the input air to the ejector, the amount of vacuum created in the drain port is controlled.

An advantage of the oil control system of the present invention is that control of leaked oil is accomplished as long as there is a supply of air. Control and capture of oil no longer depends on the total integrity of the seal.

Another advantage of the oil control system of the present invention is that removal of oil from the piston is performed after the seal has used it. The oil removal function of the present invention does not increase the friction and heat on the piston, thereby assuring stable parallelism of the slide to the bolster.

Another advantage of the oil control system of the present invention is that control of leaked oil does not depend on the design of the seal. Various seals and geometries of presses may be utilized with the invention.

A further advantage of the oil control system of the present invention is that the amount of air flow transporting the leaked oil can be adjusted depending on the oil leakage rate.

Yet another advantage of the oil control system of the present invention is that oil or cleaning fluid can be evacuated from the seal area to clean the seal housing before service personnel open the press for repair.

The invention, in one form thereof, provides a press having a frame structure with a crown and a bed. A slide, having a drive piston, is guided by the frame structure for reciprocating movement in opposed relationship to the press bed. A drive mechanism is attached to the frame structure to reciprocate the slide. Oil is used to lubricate the moving parts and may collect into an oil sump. A seal is located about the drive piston to prevent oil from a portion above the slide, such as the drive piston, from migrating to the slide or workpiece. An oil control mechanism is arranged about the seal to vacuum oil leaking from the seal, away from the drive piston and slide.

In one aspect of the previously described form of the invention, the oil control mechanism includes an air driven ejector or jet-pump capable of generating the necessary vacuum about the drive piston to capture the oil leaking from the oil seal. The amount of vacuum produced about the drive piston and the drain port is determined by the input air flow through the ejector.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
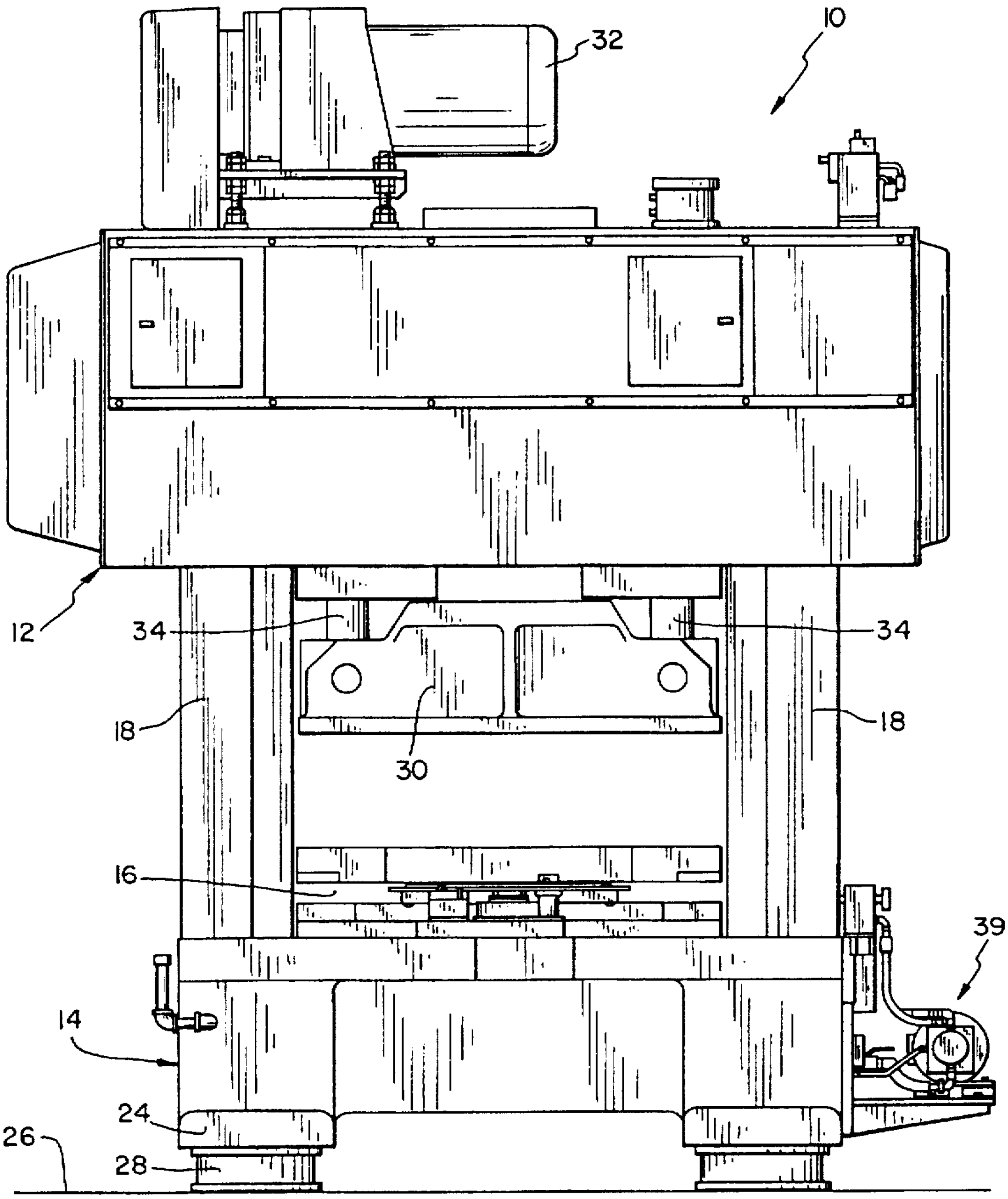
FIG. 1 is a front elevational view of a mechanical press incorporating the vacuum-induced oil control device of the present invention.

Referring now to FIG. 1, mechanical press 10 comprises a crown portion 12, a bed portion 14 having a bolster assembly 16 connected thereto and uprights 18 connecting crown portion 12 with bed portion 14. Uprights 18 are connected to or integral with the underside of crown 12 and the upper side of bed 14. Tie rods (not shown) extend through crown 12, uprights 18 and bed portion 14 and are attached at each end with tie rod nuts. Leg members 24 are formed as an extension of bed 14 and are generally mounted on the shop floor 26 by means of shock absorbing pads 28.

A slide 30 is disposed between press uprights 18 as shown in FIG. 1. Slide 30 reciprocates within press 10 by the action of main drive motor 32 attached to the top portion of crown 12. Connected to main drive motor 32 by means of a belt (not shown) is a hydraulic combination clutch/brake (not shown) as known in the art for controlling the applied torque from motor 32 to slide 30. The hydraulic combination clutch/brake is attached to slide 30 by means of a crankshaft 38 connected to a connecting rod 36 attached to drive piston 34.

The word "piston" utilized in this application identifies generally any member that slides or reciprocates within another. Specifically, the term "drive piston" relates to the portions of slide 30 that are parallel with slide movement and attached to connecting rod 36.

Figure 2:
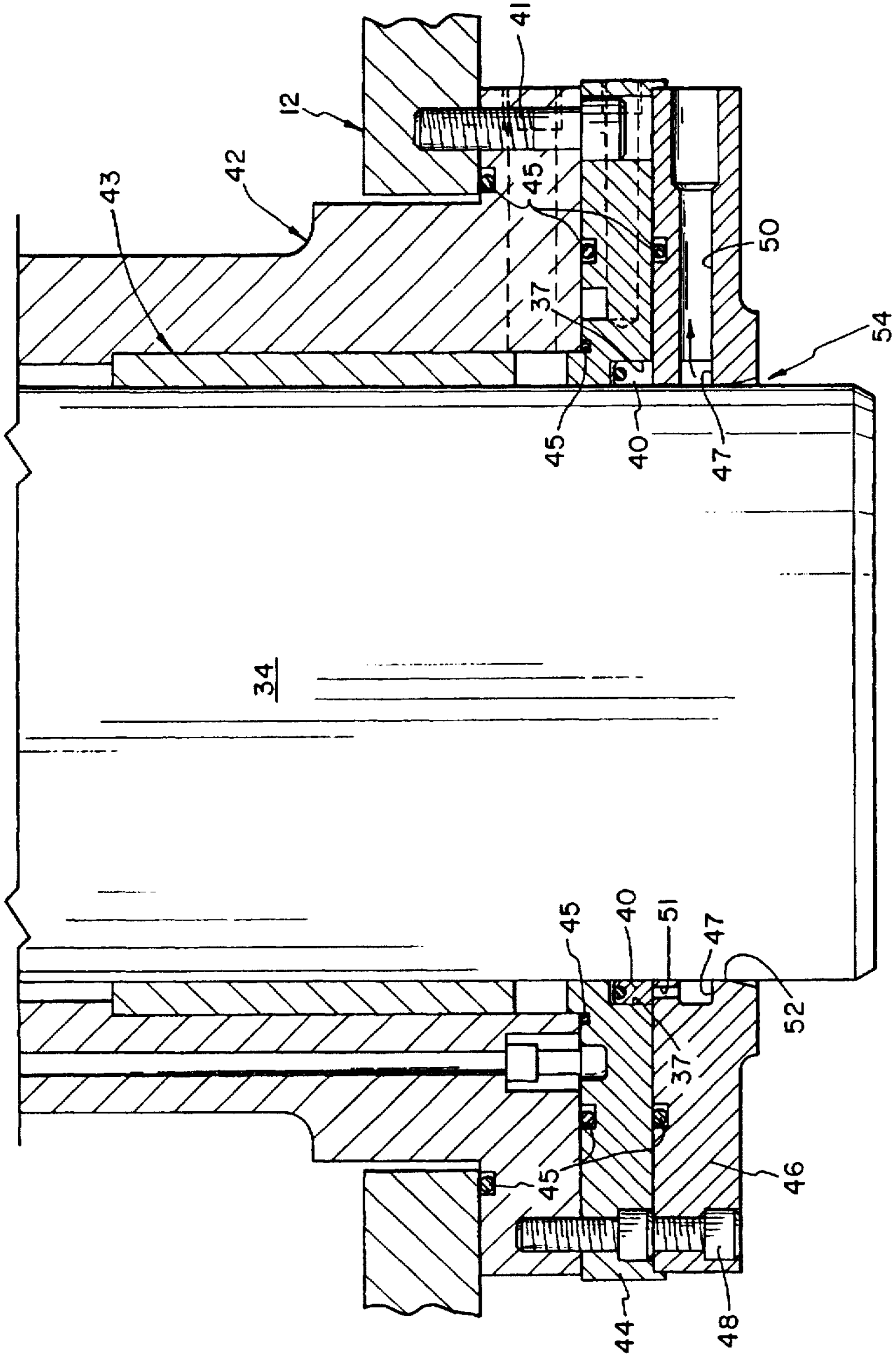
FIG. 2 is a sectional view of the oil seal and drain housing of the mechanical press.

In the prior art, a seal member has been utilized to seal about the drive piston to retain or divert lubricating oil possibly flowing from the press crown. As shown in FIG. 2, drive piston 34 is disposed for reciprocation within piston housing 42. Piston housing 42 is normally attached to crown 12. Located between piston housing 42 and drive piston 34 is a guide bushing 43 to maintain adequate clearance between drive piston 34 and piston housing 42, with a seal 40 sealing between drive piston 34 and a piston seal housing 44. Seal 40 is seated in a seal groove 37. A plurality of secondary seals 45 are interfit between metal-to-metal interfaces of press 10 as shown in FIG. 2.

The present invention, in one form thereof, comprises an oil control system 39 generating a vacuum about drive piston 42 near seal 40 to capture any oil that passes past seal 40. As shown in FIG. 2, an additional piston vacuum housing 46 is attached to piston seal housing 44 by bolts 48. An annular drain port 47 is located in bore 52 of piston vacuum housing 46 about drive piston 34. It is this drain port 47 that initially catches leaking oil by virtue of a vacuum created therein.

Located within piston vacuum housing 46 is a conduit 50 that attaches between drain port 47 and the vacuum producing mechanism to be described below. As shown in FIG. 2, bore 52 through which drive piston 42 reciprocates, may include a chamfer 54 to ensure an adequate flow of ambient air is available so oil, leaking past seal 40, will be more easily vacuumed into conduit 50 and the rest of the system.

Bore 52, between drain port 47 and the bottom edge of piston vacuum housing 46 or chamfer 54, is particularly sized to create the correct conditions for vacuuming leaking oil away from seal 40 and drive piston 34. At this location, bore 52 has approximately an 0.008" to 0.012" diametral clearance about drive piston 34. The preferred diametral clearance of approximately 0.010" has been found to create the most uniform vacuum induced air flow around piston 34 and upward toward drain port 47. The oil control system, as designed, operates effectively at one (1) inch or more of mercury vacuum level.

Between seal groove 37 and drain port 47 is a plurality of vent ports 51 permitting fluid communication therebetween. Vent port 51 operates to help seal 40 seat in seal groove 37 by allowing air trapped in groove 37 to escape. The vacuum created in drain port 47 also reduces the pressure within groove 37, thereby pulling the heel of seal 40 closer to the bottom of groove 37. Oil may also be pulled through vent port 51 to improve seal stability and seating. During a seal leak, a majority of the leaking oil will travel down the surface of drive piston 34 and be vacuumed into drain port 47 directly.

Figure 3:
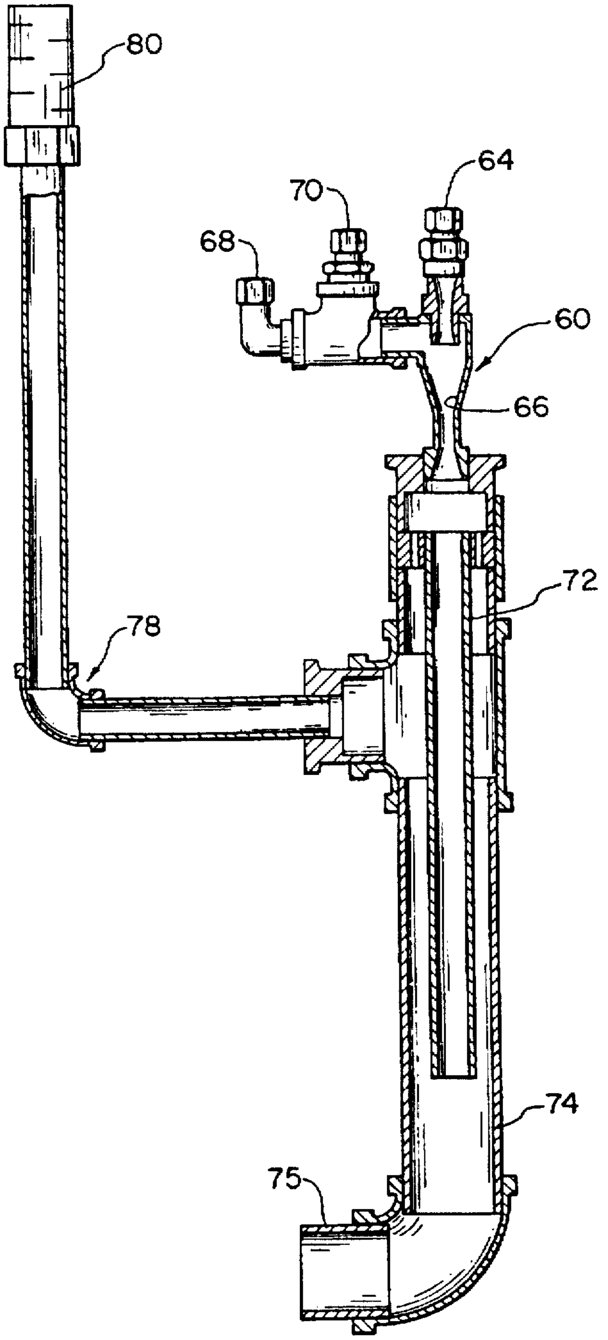
FIG. 3 is a sectional view of the drain plumbing and jet-pump mechanism.
Figure 4:
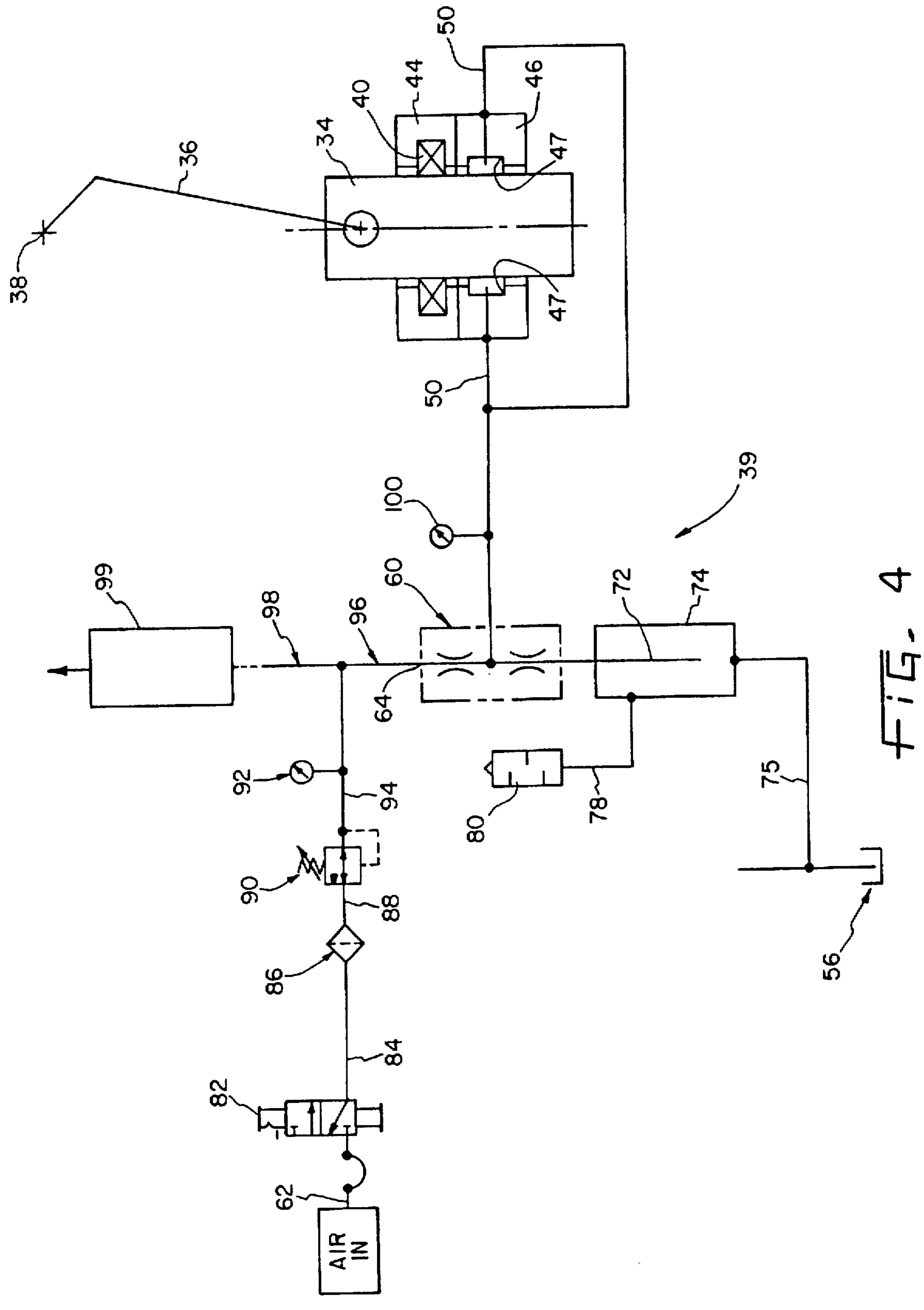
FIG. 4 is a pneumatic and vacuum schematic of one form of the system.

Oil and air vacuumed into conduit 50 proceeds to the vacuum generator 60 and press oil reservoir 56 as shown in FIG. 4. The vacuum-induced air flowing through conduit 50 can be generated by any device as is known in the art, but in the particular embodiment shown in FIG. 3, it has been found to be most reliably and efficiently generated by a device known as an ejector or jet pump 60.

Ejector 60 utilizes compressed air, from a source 62 (FIG. 4), flowing through a compressed air inlet 64 into a passageway 66, having the general configuration and shape of a nozzle, to create a venturi effect. Ejector 60 further includes two inlets 68 and 70 that each connect to a conduit 50 about a particular drive piston 34. Preferably, two conduits 50 are connected to each drain port 47.

Compressed air at a low pressure of approximately 1 to 60 pounds per square inch is introduced through inlet 64 of ejector 60. The venturi design of ejector 60 creates a vacuum pressure area within side inlets 68 and 70. This vacuum draws air and oil from drain port 47 through conduit 50 and into ejector 60. The combined flow of oil and air (an oil aerosol), from air inlets 68 and 70, exits ejector 60 through exit tube 72 at a pressure lower than at inlets 68 and 70, but higher than atmospheric pressure.

Exit tube 72 is disposed within a main drain tube 74. Air and oil, exiting exit tube 72 flow into the bottom of main drain tube 74, with the major portion of the high velocity oil aerosol created directed toward press sump oil reservoir 56. An oil reservoir 56 is connected to main drain tube 74 by oil conduit 75 (FIG. 4) to trap the entrained oil within the aerosol flow. The removal of the entrained oil is simply caused by the aerosol impacting the liquid oil surface within the oil reservoir 56. After the oil has been substantially removed from the evacuated aerosol by the oil reservoir the remaining air is now classified as exhaust air.

Along a side portion of main drain tube 74 is located an air exhaust 78 for relieving the high velocity exhaust air within drain tube 74. As shown in FIG. 3, at the far distal end of air exhaust 78 is an air baffle 80 to ensure that any remaining entrained oil within the exhaust air is removed. The system 39 is constructed so that oil in the high velocity oil aerosol, directed at the press oil reservoir 56 from main drain tube 74, is deposited in oil reservoir 56, but permits the exhaust air to escape at nearly zero back pressure, i.e., less than 2 psi.

FIG. 4 shows a schematic diagram of the present system utilized by one drive piston 34. To most reliably and efficiently operate this invention, one ejector 60 vacuum generating device must be connected to each drive piston 34 of press 10 to ensure that oil is drawn off when an oil leak occurs. By utilizing one ejector 60 per drive piston 34, the system can be constructed so that air flow will not be diverted to a point of less resistance, such as a drain housing, if a seal 40 does not leak. This maintains the correct flow of air within the system.

By drawing off oil at several points on drain port 47, an oil leak is kept under control for all rates of possible leakage.

The air flow from source 62 utilized by vacuum ejector 60 is preferably kept on at all times, even while the press 10 is not running, so as to constantly evacuate any lubricating oil leaking from about seal 40.

As shown in the schematic drawing of FIG. 4, compressed air source 62 is attached to a valve 82 to shut off the air flow from source 62 entering oil control system 39. From valve 82, an air hose 84 connects to an air filter 86 and from there another air hose 88 is connected to a pressure regulator 90 (FIG. 4). This pressure regulator is of a known type, to permit the operator to vary the air pressure through the oil control system. The press operator is allowed to monitor the compressed air pressure by an optional air pressure gauge 92 connected in line with pressure regulator 90 by means of an air hose 94. Through air hose 94, compressed air flows to air hose 96 and on into air inlet 64 of ejector 60.

As shown in FIG. 4, air hose 96 may attach to a branch portion 98 that can communicate compressed air to other ejectors 60 as represented by block 99.

In operation, the oil control system 39, in one form thereof, operates as follows. During press 10 operation, power from motor 32 will be conducted to crankshaft 38 shown schematically in FIG. 4. Rotation of crankshaft 38 will cause connecting rod 36 to change rotational motion of crankshaft 38 to rectilinear reciprocating motion of drive piston 34. Seal 40 seals between reciprocating drive piston 34 and housings 44 and 46.

Any oil escaping down past seal 40 along drive piston 34 will be caught in annular drain port 47 connected to conduit 50. Compressed air from air source 62, passing through valve 82, filter 86 and regulator 90, will be injected into ejector 60. Through a venturi effect created in ejector 60, a low pressure area will be developed in conduit 50 connected to ejector 60 through air inlets 68 and 70. A combination of air and oil drawn through conduit 50 is now caused to flow through exit tube 72.

The oil, entrained within the air in exit tube 72, will drop out upon contact with the bottom of main drain tube 74, or with contact with press oil reservoir 56. The air, now substantially free from entrained oil, is allowed to pass through air exhaust tube 78 through an air baffle or filter 80 back to the ambient atmosphere.

As shown in FIG. 4, an optional vacuum gauge 100 may be placed in communication with conduit 50 to measure the vacuum developed by ejector 60.

The amount of air flow transporting the oil can be adjusted for various leakage rates of seals 40 by opening and closing regulator 90. Further, oil control is accomplished as long as there is a supply of compressed air. Oil control of the present invention does not depend on 100% integrity of the seal or the intervention of the press operator.

Further due to particular products operated on by press 10, it may be necessary to install air filters within chamfer 54 or within conduits 50 to prevent contamination from the die or slide 30 to be drawn into press oil reservoir 56.

The present invention, as shown in the previous embodiment, is not limited to oil control mechanisms located within the crown of a press. Depending upon the size of press 10, the required tonnage and different operating mechanisms, different locations for oil control system 39 are possible.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling oil around a vertically reciprocating member in a press comprising the steps:

providing a circumferential seal around the vertically reciprocating member;

arranging a vacuum housing with a drain port proximate said seal for vacuuming oil leaking past said seal;

providing a vacuum generator in communication with said drain port;

providing a source of air to said drain port;

operating said vacuum generator to create low pressure within said drain port such that oil leaking past said seal is drawn with air into said drain port and toward said vacuum generator; and providing a plurality of vent ports between said drain port and a groove in which said seal is located, whereby the low pressure within said drain port pulls said seal toward a bottom of the seal groove.

2. The method of claim 1 further comprising the step of directing the air and oil drawn out of said drain port into a drain tube whereby entrained oil is withdrawn from the mixture by contact with said drain tube.

3. The method of claim 1 further comprising the step of varying the vacuuming strength created by said vacuum generator to vary the flow of air transporting the oil.

4. The method of claim 1 wherein the press comprises a mechanical press and the reciprocating member comprises a drive piston.

5. The method of claim 1 wherein said vacuum generator comprises a jet pump.

6. The method of claim 1 further comprising the step of providing an oil mist eliminator downstream from said vacuum generator to catch leaking oil drawn into the air flow.

7. The method of claim 6 wherein said oil mist eliminator comprises a drain tube.

8. The method of claim 6 wherein said oil mist eliminator comprises an air filter.

9. The method of claim 6 wherein said oil mist eliminator comprises an oil reservoir.

* * * * *